United States Patent [19]

Sweeney

[11] Patent Number: 4,804,449

[45] Date of Patent: Feb. 14, 1989

[54] ELECTROLYTIC CELL

[76] Inventor: Charles T. Sweeney, 10526 Gulfdale, San Antonio, Tex. 78216

[21] Appl. No.: 90,404

[22] Filed: Aug. 27, 1987

Related U.S. Application Data

[63] Continuation-in-part of Ser. No. 832,987, Feb. 25, 1986, abandoned.

[51] Int. Cl.$^4$ ............... C25B 9/00; C25B 11/03; C25B 13/08
[52] U.S. Cl. .................... 204/256; 204/296; 204/284; 204/128; 204/95
[58] Field of Search ............... 204/254–258, 204/296, 128, 98, 95, 284, 151

[56] References Cited

U.S. PATENT DOCUMENTS

| | | | |
|---|---|---|---|
| 4,505,797 | 3/1985 | Hodgdon et al. | 204/296 X |
| 4,539,082 | 9/1985 | Klotz et al. | 204/296 X |
| 4,647,360 | 3/1987 | Waters et al. | 204/296 |
| 4,752,364 | 6/1988 | Dhooge | 204/151 |

*Primary Examiner*—Donald R. Valentine
*Attorney, Agent, or Firm*—Neal J. Mosely

[57] ABSTRACT

An electrolytic cell is disclosed comprising two or more compartments containing an anode, cathode, and one or more electrically neutral bi-polar electrodes. These cells can be utilized as batch or flowing cells. Increased capacity and lower maintenance is obtained using a diaphragm separating the compartments. This diaphragm is a special, finely woven synthetic non-ionic fabric having a low permeability. The preferred diaphragm is of Kanecaron modacrylic fiber. The bi-polar electrodes may be any of several configurations and act as a charged electrical component in a solution. When bi-polar electrodes are used in an anode compartment of a chlorine electrolytic cell, oxygen species are produced which blend with the chlorine species of a standard anode reaction to produce $Cl_2$, $ClO_2$ and oxygen species. When used in a cathode compartment, bi-polar electrode configurations serve to cool the caustic due to the agitation occuring on the bi-polars as well as increase buildup of caustic concentration. The diaphragm material is superior to NAFION in maintaining separation between two electrolytes of different viscosities and less back migration has been observed.

14 Claims, 4 Drawing Sheets

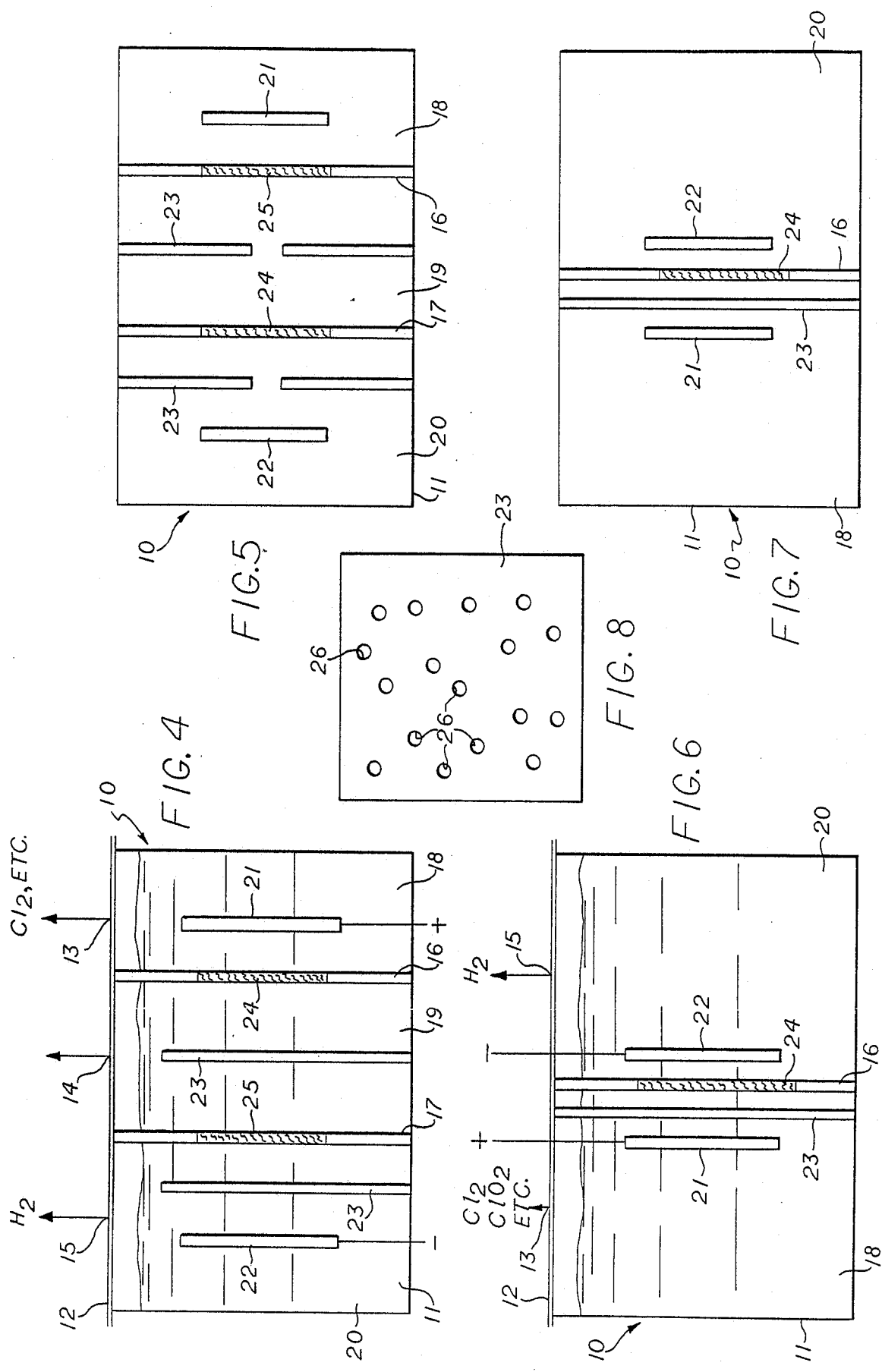

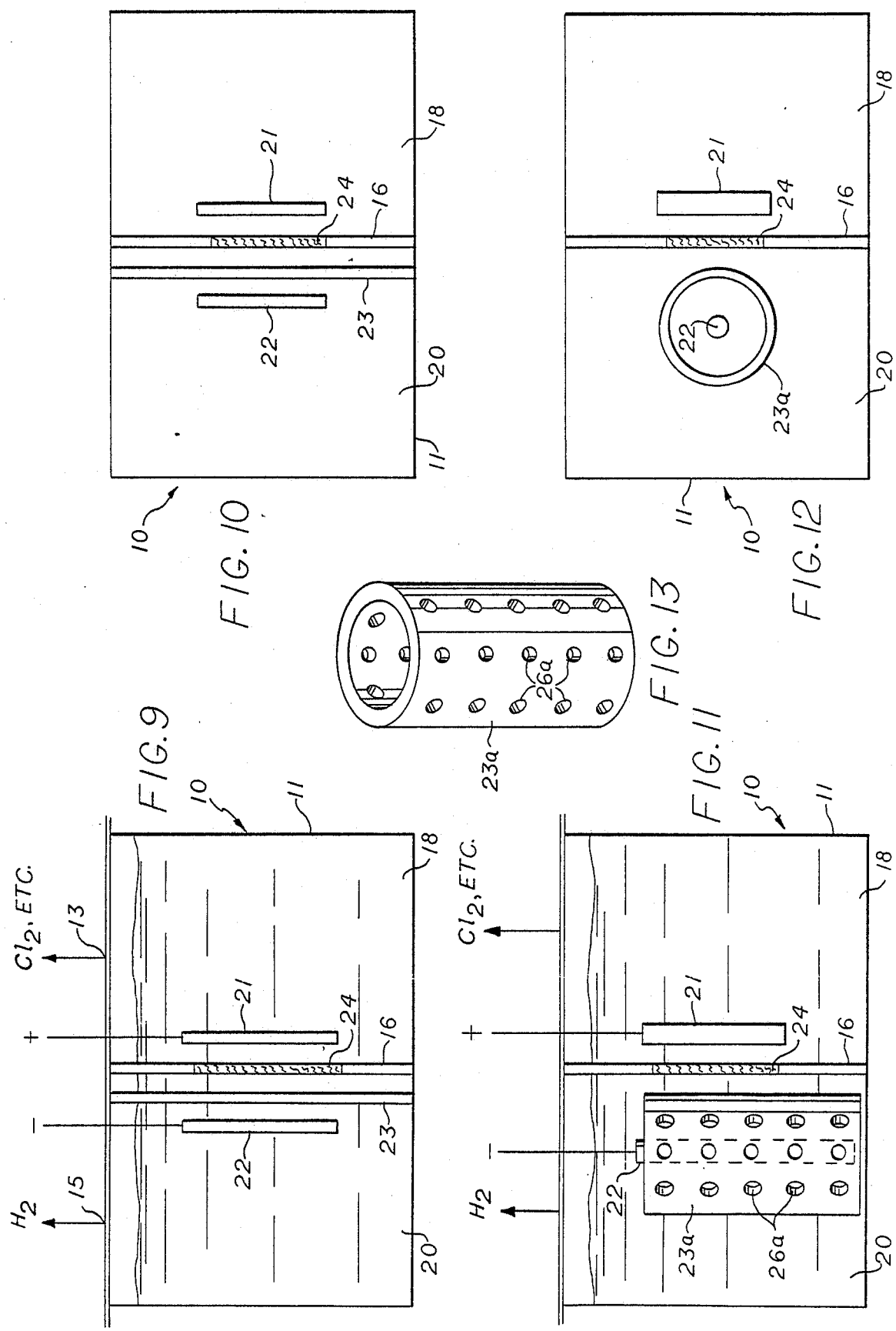

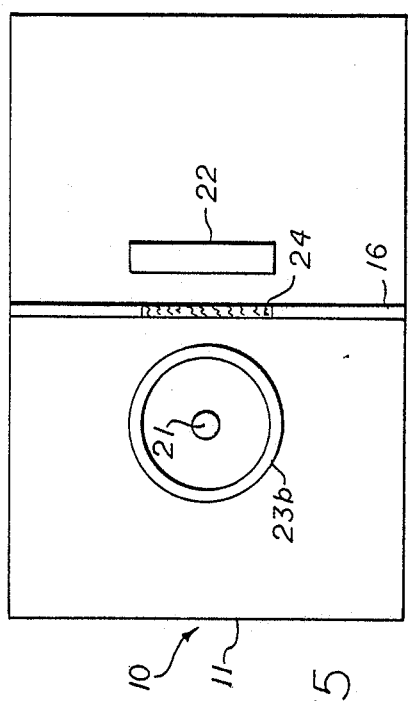
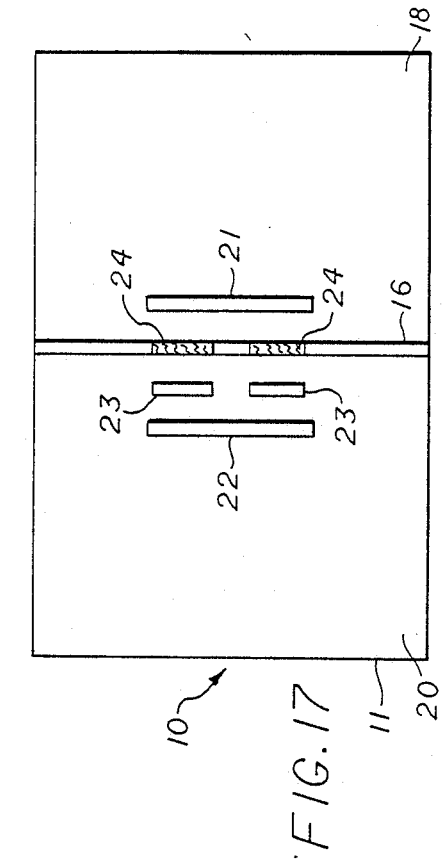
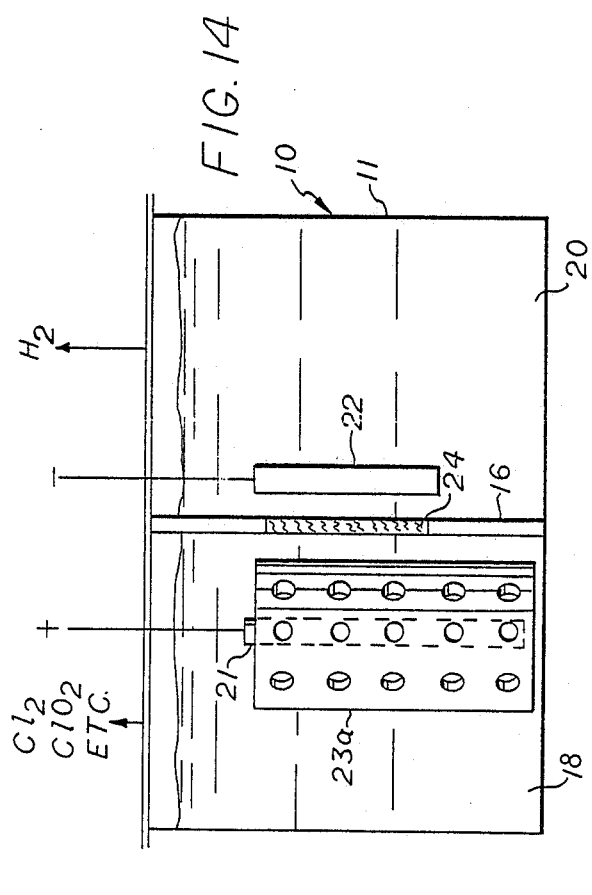
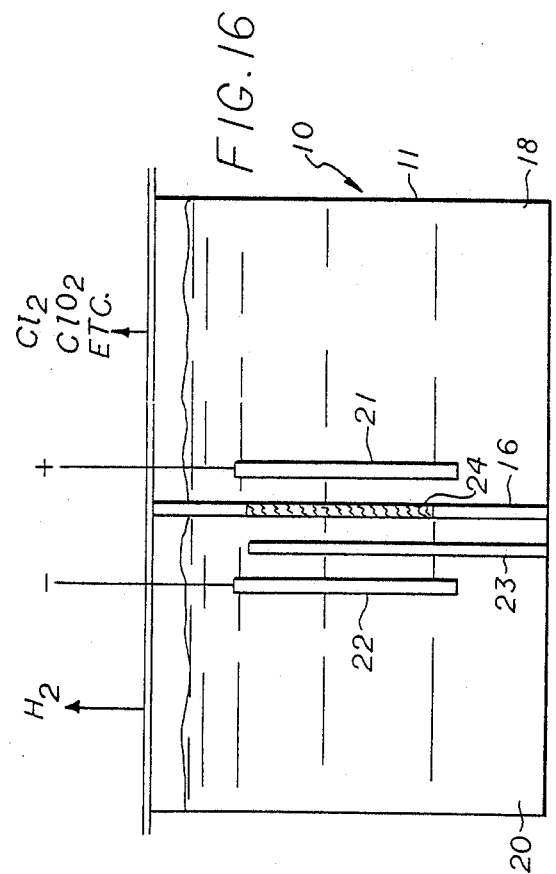

ELECTROLYTIC CELL

CROSS REFERENCE TO RELATED APPLICATION

This application is a continuation-in-part of copending application Ser. No. 832,987, filed 2-25-86, now abandoned.

BACKGROUND OF THE INVENTION

1. Field of the Invention

This invention relates to new and useful improvements in electrolytic generators and to methods of generating mixtures of chlorine and oxygen species for treating bodies of water, such as, swimming pools, baths, reservoirs, sewage, etc. and for bleaching chemical pulp, etc.

2. Brief Description of the Prior Art

The use of chlorine for disinfecting bodies of water such as, swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generation equipment.

The use of chlorine dioxide in disinfecting bodies of water and in bleaching chemical pulp is well known. Chlorine dioxide is a dangerous and explosive gas and is usually produced as an aqueous solution at the point of usage by chemical decomposition of chlorine salts. Production of chlorine dioxide electro-chemically from chlorides was unknown in the literature prior to about 1982.

The production of ozone and other oxygen species is well known today but oxygen species from an electrolytic cell is not well known. Oxygen species and chlorine produce varying amounts of chlorine dioxide. The use of non-ionic synthetic fiber diaphragms from materials such as Kanecaron modacrylic fiber is not reported in the literature.

Lindstaedt U.S. Pat. No. 2,887,444 discloses a system in which a body of water, such as a swimming pool, is provided with a low concentration of dissolved common salt and a stream of water is removed from the main body and electrolyzed to produce chlorine and the chlorine and water stream returned to the main body of water.

Murray U.S. Pat. No. 3,223,242 discloses another type o electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857 and Yates U.S. Pat. No. 4,094,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosufonic acid polymer membranes. The perfluorosulfonic acid membranes were developed by Dupont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat No. 1,184,321 as discussing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membrane is also discussed in the technical literature, e.g. Dupont Magazine, May-June 1973, pages 22–25 and a paper entitled "Perfluorinated on Exchange Membrane" by Grot, Munn and Walmsley, presented to the 141st National Meeting of the Electro-Chemical Society, Houston, Tex., May 7-11, 1972.

The structure of electrodes used in electrolytic cells is set forth the previously listed patents. Additionally, the following patents show particular configurations of anodes or cathodes used in such cells.

Giacopelli U.S. Pat. No. 3,375,184 discloses an electrolytic cell with controlable multiple electrodes which are flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl, Electrochemical Technology 5, 56–58 (1967) Western and Hoogland report that $ClO_2$ is not produced in the electrolysis of NaCl in the absence of chlorates.

Sweeney U.S. Pat. No. 4,256,552 discloses an electrolytic generator for chlorination of swimming pools, water systems, etc., in which a bipolar electrode is positioned in the anode compartment between the anode an cation-exchange membrane in the wall separating the compartments.

Sweeney U.S. Pat. No. 4,334,968 discloses improvements on the cell or generator of U.S. Pat. No. 4,256,552 and discloses the production of chlorine dioxide in the cell.

Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions.

Sweeney U.S. Pat. No. 4,608,117 discloses a cell having three compartments, with the anode and cathode in the outer compartments and the bipolar electrode in the central compartment. A cation-exchange membrane is positioned in the wall between the central compartment and the cathode compartment, while an anion-exchange membrane is positioned in the wall between the central compartment and the anode compartment.

Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control.

In subsequent studies, it has been found that cells of the type shown in U.S. Pat. Nos. 4,256,552; 4,334,968; 4,248,681 can be operated with very low salt concentration to produce oxidizing gases containing very small amounts of chlorine or chlorine compounds. It has been necessary to replenish the water and salt in the cell without shutting the system down. This invention is directed to the solution of that problem.

SUMMARY OF THE INVENTION

One of the objects of this invention is to provide a new and improved system of treatment and method of treatment of bodies of water, such as, swimming pools, baths, reservoirs, sewage, etc., and bleaching of chemical pulp, etc., utilizing an electrolytic cell of novel construction.

Another object of this invention is to provide a new and improved electrolytic cell for production of mixtures of chlorine, chlorine dioxide and oxygen species for treatment of bodies of water and bleaching.

Another object of this invention is to provide a new and improved electrolytic cell having an arrangement comprising an anode and a cathode and a synthetic fiber membrane, which produces a mixture of chlorine, chlorine dioxide and oxygen species.

Still another object of this invention is to provide a method of producing a mixture of chlorine, chlorine dioxide and oxygen species by electrolysis of an aqueous solution of a chloride salt.

Still another object of this invention is to provide a method and apparatus in which chlorine dioxide is produced by electrolysis of an aqueous solution of chloride salt utilizing an anode, cathode, and a synthetic exchange membrane, means for pumping solution from the cathode-containing compartment to the anode-containing compartment to control pH therein, and a pH monitor controlling compartment to control pH therein, and a pH monitor controlling the pumping means in response to pH adjacent to the anode.

Still another object is to provide new diaphragm material with temperature, strength, porosity hole size which improves electrolytic cell solution separation.

Still another object is to show different configurations of neutrol bi-polars and how these designs can increase yield of oxygen species from anodic water base solutions.

Still another object is to show bi-polar configurations have benefits in a cathodic caustic environment for cooling and expelling hydrogen more rapidly.

Other objects of this invention will become apparent from time to time throughout the specification and the claim as hereinafter related.

BRIEF DESCRIPTION OF THE DRAWINGS

FIG. 4 is a schematic view, in elevation, of an electrolytic cell having one anode compartment, one cathode compartment, and a central compartment with split bipolar electrodes therein and non-ionic synthetic fiber diaphragms separating the compartments.

FIG. 5 is a plan view of the electrolytic generator shown in FIG. 4.

FIG. 6 is a schematic view, in elevation, of an electrolytic cell having one anode compartment, one cathode compartment, a non-ionic synthetic fiber diaphragm separating the compartment and a bipolar electrode extending completely across the anode compartment and having holes permitting flow of electrolyte around the electrode.

FIG. 7 is a plan view of the electrolytic generator shown in FIG. 6.

FIG. 8 is a plan view of the bipolar electrode of FIGS. 6 and 7.

FIG. 9 is a schematic view, in elevation, of an electrolytic cell having one anode compartment, one cathode compartment, a non-ionic synthetic fiber diaphragm separating the compartments and a bipolar electrode extending completely across the cathode compartment and having holes permitting flow of electrolyte around the electrode.

FIG. 10 is a plan view of the electrolytic generator shown in FIG. 9.

FIG. 11 is a schematic view, in elevation, of an electrolytic cell having one anode compartment, one cathode compartment, a non-ionic synthetic fiber diaphragm separating the compartments and a cylindrical bipolar electrode extending around the cathode and having holes permitting flow of electrolyte around the electrode.

FIG. 12 is a plan view of the electrolytic generator shown in FIG. 11.

FIG. 13 is a plan view of the bipolar electrode of FIGS. 11 and 12.

FIG. 14 is a schematic view, in elevation, of an electrolytic cell having one anode compartment, one cathode compartment, a non-ionic synthetic fiber diaphragm separating the compartments and a cylindrical bipolar electrode extending around the anode and having holes permitting flow of electrolyte around the electrode.

FIG. 15 is a plan view of the electrolytic generator shown in FIG. 14.

FIG. 16 is a schematic view, in elevation, of an electrolytic cell having one anode compartment, one cathode compartment, a pair of spaced non-ionic synthetic fiber diaphragms in a wall separating the compartments, and a pair of bipolar electrodes in said cathode compartment aligned with said diaphragms.

FIG. 17 is a plan view of the electrolytic generator shown in FIG. 16.

DESCRIPTION OF A PREFERRED EMBODIMENT

Figure 1:
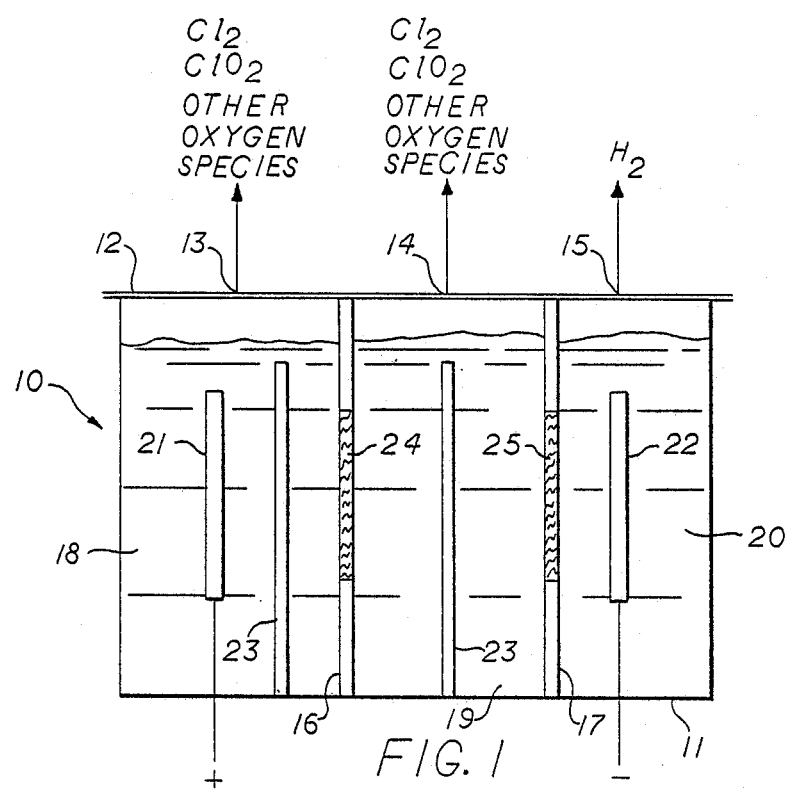
FIG. 1 is a schematic view, in elevation, of an electrolytic cell having two anode compartments and one cathode compartment with split bipolar electrodes in each anode compartment and non-ionic synthetic fiber diaphragms separating the compartments.
Figure 2:
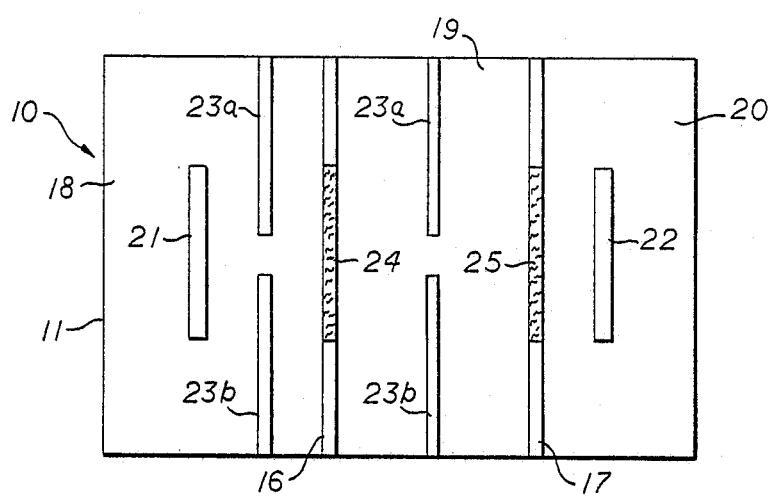
FIG. 2 is a plan view of the electrolytic generator shown in FIG. 1.

Referring to FIGS. 1 and 2, there is shown an electrolytic generator 10 comprising a hollow container 11 having a removable coVer 12 with openings 13, 14 and 15 for removal of electrolytic products from the cell.

Hollow container 10 is divided by vertical walls 16 and 17 into three compartments 18, 19 and 20. Compartment 18 contains anode 21 and compartment 29 contains cathode 22. A neutral or bipolar electrode 23 is positioned in the middle compartment 19 and in the anode compartment 18.

Walls 16 and 17 have windows or openings therein closed or sealed by diaphragms 24 and 25, respectively. In FIG. 2, it is seen that the bipolar electrode used is in the form of a split electrode with sections 23a and 23b. Electrodes 23 may be solid is in FIG. 3B or may have holes 26 (used for circulation of electrolyte from one side to the other where the electrodes seal off the container) as in FIG. 3A.

Diaphragms 24 and 25 are made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and organic solvents.

OPERATION

A batch operation in the chlorine, chlorine dioxide, oxygen species generator 10 of FIGS. 1 and 2 is as follows:

A D.C. potential of 12 volts or less is applied across the anode and cathode electrodes. The cathode compartment 20 contains a NaOH solution and the anode compartment 18 and bipolar electrode compartment 19 contain a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes. trodes.

When bi-polar electrodes 23 are added and positioned properly in the anode compartment 18 and center compartment 19, noticeable reaction occurs on the surface of the bi-polars. The more bi-polar surface, the more reaction observed at certain pH levels. The anode solution pH drops very rapidly when bi-polars are used. The following tests were conducted on gas from an anode compartment with bi-polars installed.

Anode gas samples, from compartments 18 and 19, were scrubbed thru glycine solutions and into actified KI (Potassium Iodide) the object being let $Cl_2$ be trapped by glycine and other gases go through into the KI. The chlorine dioxide would go thru the glycine, but so would $O_3$ and other oxygen species.

Therefore a UV analyzer was used in evaluating the presence of $ClO_2$ and $O_3$ specifically. Results indicated ozone present in the output gas peaking at 194 nm on the UV scale. In addition, $H_2O_2$ (hydrogen peroxide) was present being a breakdown product of water and $O_3$. $H_2O_2$ is indicated as a broad spectrum between 210–230 nm on the UV scale.

A chlorine dioxide analyzer by DuPont was utilized in specifically identifying $ClO_2$ content. The double beam UV system of DuPont proved the presence of $ClO_2$ from 5% to 8%.

A problem is encountered when a mixed oxidant is used in equipment designed to identify one specific oxidant. The ability to separate each of these oxidants individually may be beyond current testing methodology. As caustic concentration increases and anode solution saturates, the cell current increases substantially and the cell voltage must be lowered to decrease current. Current and poundage yield of a cell are directly proportionate. In the cathode compartment bi-polars were added which showed immediately to release bubbles of hydrogen which would tend to assist in hydrogen removal and purer grade of NaOH quicker than without bi-polars. A mixing effect plus some cooling was observed.

In prior art electrolytic cells of this general type, it has been necessary to separate the anode and cathode compartments by a cationic ion-exchange membrane, preferably duPont NAFION. It was therefor unexpected to find that a cell using a non-ionic diaphragm of the finely woven acrylic fiber would function in the same manner as a cationic membrane cell.

KANECARON when compared to NAFION or similar ion exchange membranes offers the following advantages:

KANECARON is easy to work with and rugged.

KANECARON has flexibility continuously and does not harden under prolonged use as does NAFION and related ion exchange membranes.

KANECARON has very small porosity hole size and actually physically maintains separation of two solutions in an electrolytic cell better than NAFION or related ion exchange membranes.

Laboratory tests were conducted comparing KANECARON to NAFION and similar ion exchange membranes.

All ion exchange membranes allow back migration to some extent which becomes a serious problem as NaOH concentrations increase over 15%, etc. Each of the following were run for five days and then power cut off and pH monitored.

| STANDARD $Cl_2$/$ClO_2$/OXYGEN SPECIES ELECTROLYTIC CELL | |
|---|---|
| NAFION Cell | KANECARON Cell |
| Initial pH 3.3 | Initial pH 2.4 |
| After 1 day pH 6.0 | After 1 day 2.5 |
| After 2 days pH 8.2 | After 2 days 3.0 |
| After 3 days pH 10.0 | After 3 days 3.5 |
| (Stopped) | After 4 days 3.5 |
| Anode carbon deteriorated | After 5 days 3.7 |
| and anode solution black. | No anode deterioration. |

KANECARON allows chemical electrolytic cells to be turned off and on for duration without loss of process or efficiency.

At this time, it seems that KANECARON is a direct substitute for NAFION or other ion exchange membrane in most applications of small size or low poundage output systems.

KANECARON performs well in NaOH concentration of 25% concentration and temperature of 100° centigrade; in addition, HClO solutions of 36% concentration and temperature of 100° with no adverse affect.

DESCRIPTION OF ANOTHER PREFERRED EMBODIMENT

FIGS. 4 and 5 illustrate a three compartment cell with bi-polars utilized in the center compartment and the cathodic compartment.

Referring to FIGS. 4 and 5, there is shown an electrolytic generator 10 comprising a hollow container 11 having a removable cover 12 with openings 13, 14 and 15 for removal of electrolytic products from the cell.

Hollow container 10 is divided by vertical walls 16 and 17 into three compartments 18, 19 and 20. Compartment 18 contains anode 21 and compartment 29 contains cathode 22. A neutral or bipolar electrode 23 is positioned in the middle compartment 19 and in the cathode compartment 20.

Walls 16 and 17 have windows or openings therein closed or sealed by diaphragms 24 and 25, respectively. In FIG. 2, it is seen that the bipolar electrode used is in the form of a split electrode with sections 23a and 23b. Electrodes 23 may be solid is in FIG. 3B or may have holes 26 (used for circulation of electrolyte from one side to the other where the electrodes seal off the container) as in FIG. 3A.

Diaphragms 24 and 25 are made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and organic solvents. These are the same diaphragms used in the cells described above for FIGS. 1 and 2 of the drawings.

OPERATION

A batch operation in the electrolytic cell 10 of FIGS. 4 and 5 is as follows:

A D.C. potential of 12 volts or less is applied across the anode and cathode electrodes. The cathode compartment 20 contains a NaOH solution and the anode compartment 18 and bipolar electrode compartment 19 contain a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When bi-polar electrodes 23 are added and positioned in the cathode compartment 20 and center compartment 19, there was an immediate release bubbles of hydrogen which tends to assist in hydrogen removal and purer grade of NaOH quicker than without bi-polars. A mixing effect plus some cooling was observed.

ANOTHER PREFERRED EMBODIMENT

Referring to FIGS. 6 and 7, there is shown an electrolytic generator 10 comprising a hollow container 11 having a removable cover 12 with openings 13, and 15 for removal of electrolytic products from the cell. Hollow container 10 is divided by vertical wall 16 into two compartments 18 and 20. Compartment 18 contains anode 21 and compartment 29 contains cathode 22. A neutral or bipolar electrode 23 is positioned in the anode compartment 18 and extends completely across the cell.

Wall 16 has a window or opening therein closed or sealed by diaphragm 24. In FIG. 7, it is seen that the bi-polar electrode used is in the form of a single electrode extending completely across the cell and having holes 26 for circulation of electrolyte from one side to the other as in FIG. 8.

Diaphragm 24 is made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and organic solvents.

OPERATION

A batch operation in the chlorine, chlorine dioxide, oxygen species generator 10 of FIGS. 6 and 7 is as follows:

A D.C. potential of 12 volts or less is applied across the anode and cathode electrodes. The cathode compartment 20 contains a NaOH solution and the anode compartment 18 contains a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When bi-polar electrodes 23 are added and positioned properly in the anode compartment 18, noticeable reaction occurs on the surface of the bi-polars. The more bi-polar surface, the more reaction observed at certain pH levels. The anode solution pH drops very rapidly when bi-polars are used. The following tests were conducted on gas from an anode compartment with bi-polars installed.

Anode gas samples, from compartment 18, was scrubbed thru glycine solutions and into actified KI (Potassium Iodide) the object being let $Cl_2$ be trapped by glycine and other gases go through into the KI. The chlorine dioxide would go thru the glycine, but so would $O_3$ and other oxygen species.

Therefore a UV analyzer was used in evaluating the presence of $ClO_2$ and $O_3$ specifically. Results indicated ozone present in the output gas peaking at 194 nm on the UV scale. In addition, $H_2O_2$ (hydrogen peroxide) was present being a breakdown product of water and $O_3$. $H_2O_2$ is indicated as a broad spectrum between 210–230 nm on the UV scale.

A chlorine dioxide analyzer by DuPont was utilized in specifically identifying $ClO_2$ content. The double beam UV system of DuPont proved the presence of $ClO_2$ from 5% to 8%.

A problem is encountered when a mixed oxidant is used in equipment designed to identify one specific oxidant. The ability to separate each of these oxidants individually may be beyond current testing methodology. As caustic concentration increases and anode solution saturates, the cell current increases substantially and the cell voltage must be lowered to decrease current. Current and poundage yield of a cell are directly proportionate. In the cathode compartment bi-polars were added which showed immediately to release bubbles of hydrogen which would tend to assist in hydrogen removal and purer grade of NaOH quicker than without bi-polars. A mixing effect plus some cooling was observed.

In prior art electrolytic cells of this general type, it has been necessary to separate the anode and cathode compartments by a cationic ion-exchange membrane, preferably duPont NAFION. It was therefor unexpected to find that a cell using a non-ionic diaphragm of the finely woven acrylic fiber would function in the same manner as a cationic membrane cell. KANECARON when compared to NAFION or similar ion exchange membranes offers the advantages discussed above.

DESCRIPTION OF ANOTHER PREFERRED EMBODIMENT

FIGS. 9 and 10 illustrate a two compartment cell with a bi-polar electrode utilized in the cathode compartment.

Referring to FIGS. 9 and 10, there is shown an electrolytic generator 10 comprising a hollow container 11 having a removable cover 12 with openings 13 and 15 for removal of electrolytic products from the cell. Hollow container 10 is divided by vertical wall 16 into two compartments 18 and 20. Compartment 18 contains anode 21 and compartment 29 contains cathode 22. A neutral or bipolar electrode 23 is positioned in the cathode compartment 20.

Figure 3A:
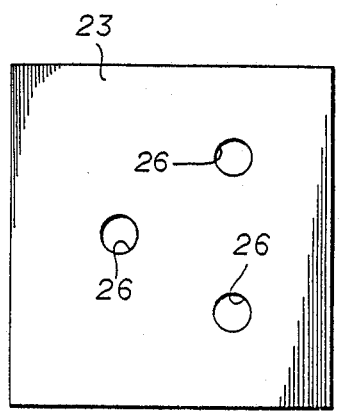
FIG. 3A is a plan view of a bipolar electrode having openings therethrough.
Figure 3B:
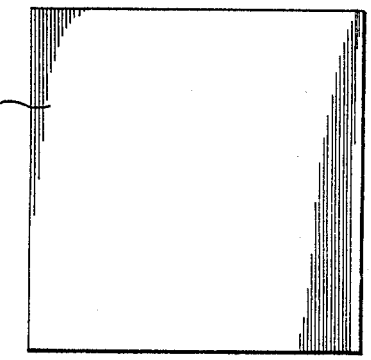
FIG. 3B is a plan view of an imperforate bipolar electrode.

Wall 16 has a window or opening therein closed or sealed by diaphragm 24. In FIG. 10, it is seen that the bipolar electrode used is in the form of a single electrode extending completely across compartment 20 and has holes 26 for circulation of electrolyte from one side to the other as seen in FIG. 3A.

Diaphragm 24 is made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and organic solvents. This is the same diaphragms used in the cells described above for FIGS. 1 and 2 of the drawings.

OPERATION

A batch operation in the electrolytic cell 10 of FIGS. 9 and 10 is as follows:

A D.C. potential of 12 volts or less is applied across the anode and cathode electrodes. The cathode compartment 20 contains a NaOH solution and the anode compartment 18 contains a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When bi-polar electrode 23 is added and positioned in the cathode compartment 20, there was an immediate release bubbles of hydrogen which tends to assist in hydrogen removal and purer grade of NaOH quicker than without bi-polars. A mixing effect plus some cooling was observed.

DESCRIPTION OF ANOTHER PREFERRED EMBODIMENT

FIGS. 11 and 12 illustrate a two compartment cell with a cylindrical bi-polar electrode utilized in the cathode compartment.

Referring to FIGS. 11 and 12, there is shown an electrolytic generator 10 comprising a hollow container 11 having a removable cover 12 with openings 13 and 15 for removal of electrolytic products from the cell. Hollow container 10 is divided by vertical wall 16 into two compartments 18 and 20. Compartment 18 contains anode 21 and compartment 29 contains cathode 22. A cylindrical neutral or bi-polar electrode 23a is positioned in the cathode compartment 20.

Wall 16 has a window or opening therein closed or sealed by diaphragm 24. In FIG. 12, it is seen that the bipolar electrode used is in the form of a single cylindrical electrode 23a extending completely around cathode 22 and has holes 26a for circulation of electrolyte from one side to the other as seen in FIG. 13.

Diaphragm 24 is made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and organic solvents. This is the same diaphragms used in the cells described above for FIGS. 1 and 2 of the drawings.

OPERATION

A batch operation in the electrolytic cell 10 of FIGS. 11 and 12 is as follows:

A D.C. potential of 12 volts or less is applied across the anode and cathode electrodes. The cathode compartment 20 contains a NaOH solution and the anode compartment 18 contains a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When cylindrical bipolar electrode 23a is added and positioned in the cathode compartment 20, there was an immediate release bubbles of hydrogen which tends to assist in hydrogen removal and purer grade of NaOH quicker than without bi-polars. A mixing effect plus some cooling was observed.

DESCRIPTION OF ANOTHER PREFERRED EMBODIMENT

FIGS. 14 and 15 illustrate a two compartment cell with a cylindrical bi-polar electrode utilized in the anode compartment.

Referring to FIGS. 14 and 15, there is shown an electrolytic generator 10 comprising a hollow container 11 having a removable cover 12 with openings 13 and 15 for removal of electrolytic products from the cell. Hollow container 10 is divided by vertical wall 16 into two compartments 18 and 20. Compartment 18 contains anode 21 and compartment 29 contains cathode 22. A cylindrical neutral or bi-polar electrode 23b is positioned in the anode compartment 18.

Wall 16 has a window or opening therein closed or sealed by diaphragm 24. In FIG. 15, it is seen that the bipolar electrode used is in the form of a single cylindrical electrode 23b extending completely around anode 21 and has holes 26a for circulation of electrolyte from one side to the other as seen in FIG. 15.

Diaphragm 24 is made of a very fine woven filter medium made of a non-ionic modacrylic fiber marketed under the trademark KANECARON. KANECARON diaphragms are porous but non-ionic. KANECARON diaphrams are resistant to a variety of inorganic and organic acids and bases and organic solvents. This is the same diaphragms used in the cells described above for FIGS. 1 and 2 of the drawings.

OPERATION

A batch operation in the electrolytic cell 10 of FIGS. 11 and 12 is as follows:

A D.C. potential of 12 volts or less is applied across the anode and cathode electrodes. The cathode compartment 20 contains a NaOH solution and the anode compartment 18 contains a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When cylindrical bipolar electrode 23b is added and positioned in the anode compartment 18, noticeable reaction occurs on the surface of the bi-polars. The more bi-polar surface, the more reaction observed at certain pH levels. The anode solution pH drops very rapidly when bi-polars are used. The following tests were conducted on gas from an anode compartment with bi-polars installed.

Anode gas samples, from compartment 18, was scrubbed thru glycine solutions and into actified KI (Potassium Iodide) the object being let $Cl_2$ be trapped by glycine and other gases go through into the KI. The chlorine dioxide would go thru the glycine, but so would $O_3$ and other oxygen species.

Therefore a UV analyzer was used in evaluating the presence of $ClO_2$ and $O_3$ specifically. Results indicated ozone present in the output gas peaking at 194 nm on the UV scale. In addition, $H_2O_2$ (hydrogen peroxide) was present being a breakdown product of water and $O_3$. $H_2O_2$ is indicated as a broad spectrum between 210-230 nm on the UV scale.

A chlorine dioxide analyzer by DuPont was utilized in specfically identifying $ClO_2$ content. The double beam UV system of DuPont proved the presence of $ClO_2$ from 5% to 8%.

A problem is encountered when a mixed oxidant is used in equipment designed to identify one specific oxidant. The ability to separate each of these oxidants individually may be beyond current testing methodology. As caustic concentration increases and anode solution saturates, the cell current increases substantially and the cell voltage must be lowered to decrease current. Current and poundage yield of a cell are directly proportionate.

In prior art electrolytic cells of this general type, it has been necessary to separate the anode and cathode compartments by a cationic ion-exchange membrane, preferably duPont NAFION. It was therefor unexpected to find that a cell using a non-ionic diaphragm of the finely woven acrylic fiber would function in the same manner as a cationic membrane cell. KANECARON when compared to NAFION or similar ion exchange membranes offers the advantages discussed above.

DESCRIPTION OF ANOTHER PREFERRED EMBODIMENT

FIGS. 16 and 17 illustrate a two compartment cell with a pair of bi-polar electrodes utilized in the cathode compartment.

Referring to FIGS. 16 and 17, there is shown an electrolytic generator 10 comprising a hollow container 11 having a removable cover 12 with openings 13 and 15 for removal of electrolytic products from the cell. Hollow container 10 is divided by vertical wall 16 into two compartments 18 and 20. Compartment 18 contains anode 21 and compartment 29 contains cathode 22. A pair of neutral or bipolar electrodes 23 are positioned in the cathode compartment 20.

Wall 16 has a pair of windows or openings therein closed or sealed by diaphragms 24. In FIG. 17, it is seen that the bipolar electrode used is in the form of a pair of electrodes supported on the bottom and extending upward in spaced relation and are aligned with spaced diaphragms 24 between cathode 22 and wall 16 as seen in FIG. 17.

Diaphragm 24 is made of a very fine woven filter medium made of a non-ionic modacrylic fiber marketed under the trademark KANECARON. KANECARON diaphragms are porous but non-ionic. KANECARON diaphragms are resistant to a variety of inorganic and organic acids and bases and orgaiic solvents. This is the same diaphragms used in the cells described above for FIGS. 1 and 2 of the drawings.

OPERATION

A batch operation in the electrolytic cell 10 of FIGS. 16 and 17 is as follows:

A D.C. potential of 12 volts or less is applied across the anode and cathode electrodes. The cathode compartment 20 contains a NaOH solution and the anode compartment 18 contains a brine solution. The sodium ions migrate to the cathode compartment and the chloride ions stays within the anode compartment as chlorine and hydrochloric acid. Once the anode solution is saturated, chlorine gas begins to evolve. The cathode compartment emits hydrogen to the open air. This is the mode of operation when the cell is operated without the bipolar electrodes.

When bi-polar electrodes 23 are added and positioned in the cathode compartment 20, there was an immediate release bubbles of hydrogen which tends to assist in hydrogen removal and purer grade of NaOH quicker than without bi-polars. A mixing effect plus some cooling was observed.

The neutrals or bi-polar configuration related in FIGS. 1-17 are configurations which vary substantially from those used in applicant's prior patents. Applicant's prior patents specify and define bi-polars (neutrals) as being surrounded by anode solutions on four sides. In an anode brine solution, bi-polars attached to the container walls (solution on three sides) or a solid bi-polar attached to both sides of a container (solution on two sides) have proven very beneficial.

Bi-polars cause a pH drop in the anode solution by giving off oxygen from the solution. With the proper bi-polar arrangement, pH regulation in a continuous or flowing anode cell can be adjusted by bi-polar arrangement and fluid flow rate. The most efficient placement for bi-polars are between two electrical potentials but in a charged solution any reference point in solution has a potential and once a charged surface is placed into solution conductivity between in an attempt to stabilize the "capacitor effect" of a bi-polar. The transfer agent may be oxygen, hydrogen or sodium, etc. Different solutions and pH seem to dictate the transfer agent.

In the cathode compartment, bi-polars appear to eliminate hydrogen quickly and add in concentration of NaOH. An added benefit is a cooling effect and circulation of NaOH.

While this invention has been described fully and completely whith special emphasis on several preferred embodiments, it should be understood that within the scope of the appended claims this invention may be practiced otherwise than as specifically described above.

I claim:

1. A chlorine, chlorine dioxide, oxygen species generator comprising;
   a hollow container having a wall dividing the same into a first and second compartment,
   said wall having an opening therein closed by a woven non-ionic modacrylic fiber diaphragm with a porosity sufficiently small to substantially prevent back migration of sodium ions during operation of the generator,
   an anode positioned in said first compartment,
   a cathode positioned in said second compartment,
   a bipolar electrode positioned in one of said compartments having a configuration permitting flow of electrolyte around said electrode,
   openings for introduction of electrolyte into said container,
   openings for discharge of electrolytic reaction products from each of said compartments, and
   said generator being adapted when filled with sodium chloride solution in said anode compartment and water or sodium hydroxide solution in said cathode compartment and energized to produce a chloride species from said anode compartment and hydrogen from said cathode compartment.

2. An electrolytic gas generator according to claim 1 in which
   at least one bipolar electrode is positioned in said anode compartment and is configured to contact electrolyte on at least two sides thereof.

3. An electrolytic gas generator according to claim 1 in which
   at least one bipolar electrode is positioned in said anode compartment and is configured to contact electrolyte on three sides thereof.

4. An electrolytic gas generator according to claim 1 in which
   at least one bipolar electrode is positioned in said cathode compartment and is configured to contact electrolyte on at least two sides thereof.

5. An electrolytic gas generator according to claim 1 in which
   at least one bipolar electrode is positioned in said cathode compartment and is configured to contact electrolyte on at three sides thereof.

6. An electrolytic gas generator according to claim 1 in which
   at least one bipolar electrode is positioned in said cathode compartment and none in said anode compartment.

7. An electrolytic gas generator according to claim 1 in which
   said container has openings for connection to sources of electrolyte for continuous flow therethrough.

8. A chlorine, chlorine dioxide, oxygen species generator comprising
   a hollow container having two walls dividing the same into first, second and third compartments,
   each wall having an opening therein closed by a woven non-ionic modacrylic fiber diaphragm with a porosity sufficiently small to substantially prevent back migration of sodium ions during operation of the generator,
   an anode positioned in said first compartment,
   a cathode positioned in said third compartment,
   a bipolar electrode positioned in said second compartment having a configuration permitting flow of electrolyte around said electrode,
   openings for introduction of electrolyte into said container in a batch or continuous manner,
   openings for discharge of electrolytic reaction products from each of said compartments, and
   said generator being adapted when filled with sodium chloride solution in said anode and bipolar electrode compartments and water or sodium hydroxide solution in said cathode compartment and energized to produce a chlorine species from said anode and bipolar electrode compartments and hydrogen from said cathode compartment.

9. An electrolytic gas generator according to claim 8 in which
   at least one bipolar electrode is positioned in said cathode compartment and none in said anode compartment, and said bipolar electrode contacts cathode electrolyte on two sides.

10. An electrolytic gas generator according to claim 8 in which
    at least one bipolar electrode is positioned in said cathode compartment and none in said anode compartment, and said bipolar electrode contacts cathode electrolyte on three sides.

11. An electrolytic gas generator according to claim 8 in which
    at least one bipolar electrode is positioned in said anode compartment and none in said cathode compartment, and said bipolar electrode contacts anode electrolyte on two sides.

12. An electrolytic gas generator according to claim 8 in which
    at least one bipolar electrode is positioned in said anode compartment and none in said cathode compartment, and said bipolar electrode contacts anode electrolyte on three sides.

13. An electrolytic gas generator according to claim 1 in which
    said bipolar electrode has a plurality of holes for circulation of electrolyte therethrough.

14. An electrolytic gas generator according to claim 8 in which
    said bipolar electrode has a plurality of holes for circulation of electrolyte therethrough.

* * * * *